United States Patent [19]

Ichihashi et al.

[11] Patent Number: 4,992,252

[45] Date of Patent: Feb. 12, 1991

[54] METHOD FOR PRODUCTION OF HYDROXYLAMMONIUM SALT

[75] Inventors: Hiroshi Ichihashi, Toyonaka; Kikuo Takeda; Hiroshi Yoshioka, both of Niihama, all of Japan

[73] Assignee: Sumitomo Chemical Company, Limited, Osaka, Japan

[21] Appl. No.: 446,665

[22] Filed: Dec. 6, 1989

Related U.S. Application Data

[63] Continuation-in-part of Ser. No. 243,504, Sep. 12, 1988, abandoned.

[30] Foreign Application Priority Data

Sep. 22, 1987 [JP] Japan ................................. 62-238185
Mar. 31, 1988 [JP] Japan ................................. 63-82031

[51] Int. Cl.$^5$ .................... C01B 21/20; C01B 21/093
[52] U.S. Cl. .................................... 423/387; 423/388; 502/185; 502/217; 502/223; 502/262; 502/334; 502/339
[58] Field of Search ........................... 423/387, 388

[56] References Cited

U.S. PATENT DOCUMENTS

3,060,133 10/1962 Jockers et al. .................. 252/472
3,996,165 12/1976 El-Ghatta et al. .............. 502/185
4,024,079 5/1977 Okuyama et al. .

FOREIGN PATENT DOCUMENTS

0002651 6/1979 European Pat. Off. .
0059907 9/1982 European Pat. Off. .
1088037 4/1960 Fed. Rep. of Germany .
1667353 6/1971 Fed. Rep. of Germany .
316468 10/1971 U.S.S.R. ......................... 502/185
916411 3/1982 U.S.S.R. ......................... 423/387

OTHER PUBLICATIONS

Chemical Abstracts (1952) Abstract of Brit. 667,870 (=US 2,628,899).
Chemical Abstracts, 86:45289t (vol. 86, 1977), Abstract of German Offen. 2,551,314.
Chemical Abstracts, 126643w (vol. 71, 1969), Abstract of JP. Patent Kokoku 69-08,989.

*Primary Examiner*—Wayne A. Langel
*Attorney, Agent, or Firm*—Stevens, Davis, Miller & Mosher

[57] ABSTRACT

A process for producing hydroxylammonium salts of hydrogenating nitrogen monoxide in an acidic medium in the presence of a catalyst which is prepared by subjecting a platinum compound to a first reductive treatment with a thiosulfate or a thiosulfate combined with an alkali metal sulfide in the presence of a catalyst carrier, and a second reductive treatment with a reductant selected from the group consisting of formic acid, hydrogen, hydrazine and sodium borohydride at a temperature of 50° C. to 150° C.

11 Claims, No Drawings

METHOD FOR PRODUCTION OF HYDROXYLAMMONIUM SALT

CROSS-REFERENCE TO RELATED APPLICATION

This is a continuation-in-part of application Ser. No. 243,504 filed on Sept. 12, 1988, abandoned.

The present invention relates to a process for producing hydroxylammonium salts by hydrogenating nitrogen monoxide in the presence of a novel catalyst. Hydroxylammonium salts are useful as important intermediates in the production of ε-caprolactam, and are also used in the synthesis of various oximes, antioxidants, dyeing auxiliaries, photographic chemicals, etc.

The production of hydroxylammonium salts by the catalytic hydrogenation of nitrogen monoxide in the presence of a catalyst in an acidic medium such as sulfuric acid or the like is a well known process. As the catalyst, a platinum-containing catalyst supported on a carrier is used, however, it is recognized that the activity and selectivity of the catalyst are influenced greatly by the kind of reductant used for preparation of the Pt-containing catalyst.

As methods for preparing catalysts for the production of hydroxylammonium salts, the followings are known:

(a) a method in which activated charcoal or graphite is used as the carrier and a reductant such as formic acid, formaldehyde or the like is added to an aqueous solution of platinum chloride, chloroplatinic acid or the like to deposit metallic platinum onto the carrier (U.S. Pat. No. 2,628,899);

(b) a method which comprises reduction of a Pt(IV) salt to Pt(II) with a reductant selected from the group consisting of sodium dithionite, its hydrolyzate, a reaction product of sodium dithionite and formaldehyde, sulfurous acid and its salt in the presence of graphite or activated charcoal, followed by deposition of resultant Pt(II) onto the carrier in the form of metallic Pt by the use of formic acid, its sodium salt or its potassium salt (U.S. Pat. No. 3,060,133);

(c) a method which comprises neutralizing or alkalizing a solution of platinum chloride or chloroplatinic acid in the presence of a carbonaceous substance, and reducing the platinum compound by the addition of a hydroxylammonium salt thereto (Japanese Patent Publication No. 44-8989); and (d) a method based on the reduction of a Pt(IV) salt with hydrazine in the presence of an acid-resistant carrier (German Patent No. 2,551,314).

However, all the above-mentioned prior methods are unsatisfactory in the selectivity regarding hydroxylammonium salts and in their yield, and necessitate complicated process for preparation of the catalyst. That is, when nitrogen monoxide is catalytically reduced with hydrogen in an acidic medium such as diluted sulfuric acid, the product obtained is not only hydroxylammonium sulfate, but ammonium sulfate and nitrous oxide are also formed as by-products. These by-products lower the selectivity regarding the hydroxylammonium salt and thereby bring about an economical disadvantage. In addition, the formation of ammonium sulfate is to be minimized because of its low commercial value. Further, since nitrous oxide constitutes an explosive mixture together with hydrogen and nitrogen monoxide, it is an important subject to improve the selectivity regarding hydroxylammonium salts from the viewpoint of safety, too.

Accordingly, it is an object of the present invention to provide a process for producing hydroxylammonium salts in the presence of a novel catalyst.

The present invention provides a process for producing hydroxylammonium salts which comprises catalytic reduction of nitrogen monoxide with hydrogen in acidic medium in the presence of a catalyst which is prepared by subjecting a platinum compound to (a) a first reductive treatment with a thiosulfate or a thiosulfate combined with an alkali metal sulfide in the presence of a catalyst carrier, and (b) a second reductive treatment with a reductant selected from the group consisting of formic acid, hydrogen, hydrazine and sodium borohydride.

Platinum compounds usable for preparation of the catalyst of the present invention include platinum (II) chloride, platinum (IV) chloride, tetrachloroplatinous (II) acid and its salts, hexachloroplatinic (IV) acid and its salts, tetrammineplatinum (II) chloride, hexammineplatinum (IU) chloride, and the like. Among them, platinum chlorides and hexachloroplatinic (IV) acid are most widely used because of their availability.

For the method of preparing catalyst according to the present invention, such conventional regeneration methods of platinum-containing catalysts as a method which comprises suspending a platinum-containing catalyst into aqua regia to dissolve metallic platinum, isolating the dissolved platinum and preparing a catalyst therefrom, and a method for regeneration of catalysts in the presence of a carrier are also successfully applicable.

For thiosulfates used as the first reductant in the present invention, sodium thiosulfate, potassium thiosulfate, barium thiosulfate, ammonium thiosulfate, ammonium sodium thiosulfate and the like are included. Among them, sodium thiosulfate is preferable because of its high selectivity.

When the amount of thiosulfate used is expressed in terms of the ratio S/Pt in which S denotes amount of sulfur atom in the thiosulfate and Pt denotes amount of platinum atom in the platinum compound, S/Pt is in the range of about 0.3 to 5, preferably 0.5 to 3. If the ratio is smaller than about 0.3, the reduction does not take place sufficiently and Pt cannot be utilized effectively as the catalyst component. If the ratio is greater than about 5, a large amount of S remains in the catalyst, causing decrease in the catalyst activity by formation of hydroxylammonium salts.

As the alkali metal sulfide used in the first reductive treatment, sodium sulfide, potassium sulfide, lithium sulfide and the like are used. Among them, sodium sulfide is most preferable, because it has high selectivity regarding the hydroxylammonium salt formation and is readily available.

When the amount of alkali metal sulfide used in the present invention is expressed in terms of the ratio S/Pt of sulfur atom S in the alkali metal sulfide to platinum atom Pt in the platinum compound, the S/Pt ratio is in the range of about 0.05 to 1, preferably 0.1 to 0.8. If the ratio is smaller than 0.01, formation of ammonium salt increases. If it is greater than about 1, formation of nitrous oxide increases and the conversion of nitrogen monoxide decreases.

The carrier such as graphite, activated charcoal, silica, alumina and the like which are conventionally used for supporting noble metals can be employed. Among them, graphite and activated characoal are preferable.

The platinum-supporting rate of the catalyst is in the range of about 0.01 to 10% by weight, preferably 0.1 to 5% by weight. If the ratio is smaller than about 0.01% by weight, the reaction activity per unit quantity of the catalyst decreases and the lifetime of catalyst tends to become shorter. If it is greater than about 10% by weight, the activity per unit quantity of catalyst reaches to the saturation and little effect is attainable in response to the increased ratio.

The first reduction of platinum compound is carried out in a state of suspension of carrier in a solution of the platinum compound. Thus, the reduction is carried out by suspending the carrier into the platinum compound solution, and adding under stirring the thiosulfate or a combination of the thiosulfate and the alkali metal sulfide. When a combination of the thiosulfate and the alkali metal sulfide is used, the two compounds may be added either simultaneously or separately and successively.

The temperature of the first reduction is about 50° C. to 150° C., and is preferably 80° C. to 100° C.

Although the time of the first reduction varies depending on kinds of the platinum compound, it is usually in the range of about 0.5 hour to 10 hours. As a rough standard, the occasion when the supernatant has become colorless may be taken as the end point of the reduction. When pH of the platinum compound solution is previously adjusted to about 1 to 11, preferably 2 to 7, the effect of the present invention is achieved more beneficially.

Then the product by the first reductive treatment of a platinum compound with a thiosulfate or a combination of a thiosulfate and an alkali metal sulfide, is further reduced with a second reductant selected from the group consisting of formic acid, hydrogen, hydrazine and sodium borohydride.

The temperature of the second reduction is about 50° C. to 150° C. If the temperature is higher than about 150° C., the selectivity regarding the hydroxylammonium salt formation decreases.

The amount of reductant used in the second reductive treatment is at least one mole per platinum atom.

The time of the second reductive treatment is usually in the range of about 0.5 hour to 10 hours.

The method for preparing catalyst according to the present invention may be employed for a method for reducing the platinum compound in the presence of other metallic salt components hitherto proposed. As said other metallic salts, salts of metals such as gold, silver, iridium, mercury, lead, arsenic, antimony, bismuth, selenium, tellurium and the like can be mentioned. As salt forms of these metals, chloride, nitrate, sulfate and the like can be employed. Although the amount of said salt is not critical, it is usually in the range of 0.001 to 0.2 as expressed in terms of the atomic ratio of the metal to platinum (British Patent No. 772,693, Japanese Patent Publication No. 39-20156).

The reason why catalysts prepared in the above-mentioned manner possess improved selectivity for the formation of hydroxylammonium salts is not well known. One of reasons, however, is estimated that the platinum compound reduced by the thiosulfate or the like tends to form particles of metallic platinum having extremely small particle diameters, i.e. so-called colloidal dispersion of platinum, which are adsorbed onto the carrier to give a catalyst carrying finely dispersed platinum particles. Further, it is also supposed that sulfur atoms remain partially in the final catalyst exercise a partial poisoning effect on the hydrogenation of nitrogen monoxide, which advance appropriately the hydrogenation of nitrogen monoxide and prevent both the formation of nitrouos oxide caused by insufficient progress of the hydrogenation as well as the formation of ammonia caused by excessive progress of the hydrogenation.

The catalytic hydrogenation of nitrogen monoxide can be effected with known apparatus according to the known procedure. Good results are obtained when the hydrogenation is carried out by introducing nitrogen monoxide and hydrogen at nitrogen monoxide/hydrogen molar ratios of ranging from about 1:1 to 1:6, preferably 1:1.5 to 1:5.

The acid present when the reaction is carried out includes mineral acids such as hydrochloric acid, sulfuric acid, nitric acid and phosphoric acid. Preferably, the concentration of acid is in the range of about 0.1 to 5N as free acid.

The reaction temperature is about 30° C. to 80° C., preferably 40° C. to 60° C.

The reaction is usually carried out under an atmospheric pressure, though an elevated pressure not exceeding 4 MPa is also applicable for the reaction.

The amount of catalyst to be suspended into the acidic medium is about 5 to 800 g, preferably 10 to 500 g, per liter of the medium.

In carrying out the reaction of the present invention, an appropriate additive may be added to the above-mentioned reaction system as a third component in addition to the catalyst. As said additive, compounds of metals such as lead, mercury, arsenic, antimony, bismuth, selenium, tellurium and the like can be used (Ger. Patent Nos. 945,752 and 956,038).

The reaction of the present invention may be carried out by a batch system using one or more reactors or by a continuous system, and the mode of reaction is not critical.

The present invention will be illustrated more clearly with reference to Examples, however, the invention is by no means limited by the Examples.

The conversion and selectivity referred to in the Examples and Comparative Examples are defined as follows:

Conversion (%) =

$$\frac{\text{Fed NO gas (ml)} - \text{Unreacted NO gas (ml)}}{\text{Fed NO gas (ml)}} \times 100$$

$(NH_3OH)_2SO_4$ selectivity (%) =

$$\frac{\text{NO gas converted to } (NH_3OH)_2SO_4 \text{ (ml)}}{\text{Fed NO gas (ml)} - \text{Unreacted NO gas (ml)}} \times 100$$

$(NH_4)_2SO_4$ selectivity (%) =

$$\frac{\text{NO gas converted to } (NH_4)_3SO_4 \text{ (ml)}}{\text{Fed NO gas (ml)} - \text{Unreacted NO gas (ml)}} \times 100$$

$(N_2O + N_2)$ selectivity (%) =

$$\frac{\text{NO gas converted to } N_2O \text{ and } N_2 \text{ (ml)}}{\text{Fed NO gas (ml)} - \text{Unreacted NO gas (ml)}} \times 100$$

EXAMPLE 1

Five grams of graphite, 0.067 g of hexachloroplatinic acid ($H_2PtCl_6.6H_2O$) and 20 ml of water were charged into a 200 ml flask and heated to 90° C. After replacing the inner atmosphere of the flask with argon gas, the mixture was stirred for 15 minutes.

A solution prepared by dissolving 0.032 g of sodium thiosulfate ($Na_2S_2O_3.5H_2O$) into 5 ml of water was slowly added and the resulting mixture was stirred at 90° C. for one hour. Then, 1.75 ml of formic acid was added, and the whole mixture was stirred at 90° C. for 3 hours, filtered and washed to obtain a platinum catalyst.

S content in this catalyst was 0.0271% by ion-chromatographic analysis after oxyen-combustion tube treatment.

The platinum catalyst thus prepared and 300 ml of 4.3N sulfuric acid were charged into a 500 ml four-necked flask equipped with a gas inlet and a gas outlet. After heating the suspension of the catalyst to 45° C., argon gas was introduced into the suspension at a flow rate of 50 ml/minute for a period of 30 minutes. Then, a gaseous mixture having composition of NO : $H_2$ = 1:4 (by mole) was introduced into the suspension at a flow rate of 100 ml/minute to effect the reaction The reaction temperature was 45° C.

Eight hours after the start of reaction, the liquid reaction mixture and discharged gas were analyzed. As the result, it was found that NO conversion was 75.6%, $(NH_3OH)_2SO_4$ selectivity was 97.6%, $(NH_4)_2SO_4$ selectivity was 0.9%, and $(N_2O+N_2)$ selectivity was 1.5%.

EXAMPLE 2

Five grams of graphite, 0.067 g of hexachloroplatinic acid ($H_2PtCl_6.6H_2O$) and 20 ml of water were charged into a 200 ml flask and heated to 90° C. After replacing the inner atmosphere of the flask with argon gas, the mixture was stirred for 15 minutes.

A solution prepared by dissolving 0.032 g of sodium thiosulfate ($Na_2S_2O_3.5H_2O$) into 5 ml of water was slowly added and the resulting mixture was stirred at 90° C. for one hour. Then hydrogen gas was introduced into the suspension at a flow rate of 50 ml/minute at 90° C. for 3 hours.

The suspension was filtered and washed to obtain a platinum catalyst. S content in this catalyst was 0.0304%.

A reaction was carried out under the same conditions as in Example 1.

Eight hours after, the reaction mixture and discharged gas were analyzed. As the result, it was found that NO conversion was 68.3%, $(NH_3OH)_2SO_4$ selectivity as 94.8%, $(NH_4)_2SO_4$ selectivity was 3.9% and $(N_2O+N_2)$ selectivity was 1.3%.

EXAMPLE 3

Ten grams of graphite, 0.133 g of hexachloroplatinic acid ($H_2PtCl_6.6H_2O$) and 20 ml of water were charged into a 200 ml flask and heated to 90° C. After replacing the inner atmosphere of the flask with argon gas, the mixture was stirred for 15 minutes.

A solution prepared by dissolving 0.029 g of sodium thiosulfate ($Na_2S_2O_3.5H_2O$) and 0.011 g of sodium sulfide ($Na_2S.6H_2O$) into 5 ml of water was slowly added and the resulting mixture was stirred at 90° C. for one hour. Then, 1.75 ml of formic acid was added, and the whole mixture was stirred at 90° C. for 3 hours, filtered and washed to obtain a platinum catalyst.

Five grams of the platinum catalyst thus prepared and 300 ml of 4.3N sulfuric acid were charged into a 500 ml four-necked flask equipped with a gas inlet and a gas outlet. After heating the catalyst suspension to 45° C., argon gas was introduced into the catalyst suspension at a flow rate of 50 ml/minute for a period of 30 minutes Then, a gaseous mixture having composition of $NO:H_2$:1:4 (by mole) was introduced into the suspension at a flow rate of 100 ml/minute to effect the reaction The reaction temperature was 45° C.

Eight hours after the start of reaction, the reaction mixture and discharged gas were analyzed. As the result, it was found that NO conversion as 72.4%, $(NH_3OH)_2SO_4$ selectivity was 98.3%, $(NH_4)_2SO_4$ selectivity was 0.5%, and $(N_2O+N_2)$ selectivity was 1.2%.

COMPARATIVE EXAMPLE 1

Five grams of graphite, 0.067 g of hexachloroplatinic acid ($H_2PtCl_6.6H_2O$) and 20 ml of water were charged into a 200 ml flask, and the mixture was heated to 90° C. After replacing the inner atmosphere of the flask with argon gas, the mixture was stirred for 15 minutes.

Then, a solution prepared by dissolving 0.032 g of sodium thiosulfate ($Na_2S_2O_3.5H_2O$) into 5 ml of water was slowly added. The resulting mixture was stirred at 90° C. for one hour, poured into rotary evaporator, and then water of the resulting mixture was evaporated at 80° C. under vacuum.

The solid obtained by vacuum evaporation was filled in a PYLEX glass tube, and hydrogen gas was introduced into the solid at a flow rate of 100 ml/minute. Then the solid was heated to 500° C., and held for 3 hr. S content in this catalyst was 0.0125%.

A reaction was carried out under the same conditions as in Example 1, using the catalyst thus obtained.

Eight hours after, the reaction mixture and discharged gas were analyzed. As the result, it was found that NO conversion was 70.2%, $(NH_3OH)_2SO_4$ selectivity as 85.2%, $(NH_4)_2SO_4$ selectivity was 13.1%, and $(N_2O+N_2)$ selectivity was 1.5%.

COMPARATIVE EXAMPLE 2

A catalyst was prepared according to the catalyst preparation method mentioned in U.S. Pat. No. 3,060,133.

Ten grams of graphite, 0.133 g of $H_2PtCl_6.6H_2O$, 14 ml of water and 0.88 ml of 36% hydrochloric acid were mixed together, and the mixture was heated to 80° C. with stirring. The suspension thus obtained was neutralized with sodium carbonate until its pH value reached 3.7, and 0.376 g of sodium acetate ($CH_3COONa.3H_2O$) was added. Then, 2% (by weight) aqueous solution of sodium dithionite was added until Pt(IV) had become undetectable. Further, 0.61 ml of formic acid was added, and the resulting mixture was stirred at 80° C. for 2 hours, filtered and washed to obtain a platinum catalyst.

A reaction was carried out under the same conditions as in Example 1, using 5 g of the platinum catalyst thus prepared.

Eight hours after, the reaction mixture and the discharged gas were analyzed As the result, it was found that NO conversion was 59.8%, $(NH_3OH)_2SO_4$ selectivity was 93.6%, $(NH_4)_2SO_4$ selectivity was 2.3%, and $(N_2O+N_2)$ selectivity was 4.1%. The concentration of sulfuric acid in the reaction mixture was 3.5N.

COMPARATIVE EXAMPLE 3

Five grams of graphite, 0.067 g of hexachloroplatinic acid ($H_2PtCl_6.6H_2O$) and 20 ml of water were charged into a 200 ml flask, and the mixture was heated to 90° C.

After replacing the inner atmosphere of the flask with argon gas, the mixture was stirred for 15 minutes.

Then, a solution prepared by dissolving 0.032 g of sodium thiosulfate ($Na_2S_2O_3 \cdot 5H_2O$) into 5 ml of water was slowly added. The resulting mixture was stirred at 90° C. for one hour, and then filtered and washed to obtain a platinum catalyst.

A reaction was carried out under the same conditions as in Example 1.

Eight hours after the start of reaction, the liquid reaction mixture and discharged gas were analyzed As the result, it was found that NO conversion was 56.0%, $(NH_3OH)_2SO_4$ selectivity was 97.8%, $(NH_4)_2SO_4$ selectivity was 0.5%, and $(N_2O + N_2)$ selectively was 1.7%. The concentration of sulfuric acid in the reaction mixture was 3.5N.

We claim:

1. A process for producing a hydroxylammonium salt which comprises catalytically reducing nitrogen monoxide with hydrogen in an acidic medium in the presence of a catalyst which is prepared by subjecting a platinum compound to (a) a first reductive treatment with a thiosulfate or a thiosulfate combined with an alakali metal sulfide in the presence of a catalyst carrier, wherein the amount of platinum supported on the catalyst carrier is 0.01 to 10% by weight; the amount of thiosulfate used in the reductive treatment is 0.3 to 5 as expressed in terms of ratio S/Pt, wherein S is the amount of sulfur atom in the thiosulfate and Pt is the amount of platinum atom in the platinum compound; and the amount of the alkali metal sulfide used in the reductive treatment is 0.05 to 1 as expressed in terms of ratio S/Pt, wherein S is the amount of sulfur atom in the alkali metal sulfide and Pt is the amount of platinum atom in the platinum compound, and (b) a second reductive treatment with a reductant selected from the group consisting of formic acid, hydrogen, hydrazine and sodium borohydride at a temperature of 50° C. to 150° C.

2. The process for producing a hydroxylammonium salt according to claim 1, wherein the molar ratio of hydrogen to nitrogen monoxide is 1 to 6.

3. The process for producing a hydroxylammonium salt according to claim 1, wherein said acidic medium is a mineral acid having concentration of 0.1N to 5N.

4. The process for producing a hydroxylammonium salt according to claim 1, wherein the temperature of catalytic reduction of nitrogen monoxide is 30° C. to 80° C.

5. The process for producing a hydroxylammonium salt according to claim 1, wherein said carrier is graphite, activated charcoal, silica or alumina.

6. The process for producing a hydroxylammonium salt according to claim 1, wherein said platinum compound is selected from the group consisting of platinum (II) chloride, platinum (IV) chloride, tetrachloroplatinous (II) acid, hexachloroplatinic (IV) acid, salts of these acids, tetrammineplatinum (II) chloride and hexammineplatinum (IV) chloride.

7. The process for producing a hydroxylammonium salt according to claim 1, wherein said thiosulfate is sodium thiosulfate, potassium thiosulfate, barium thiosulfate, ammonium thiosulfate or ammonium sodium thiosulfate.

8. The process for producing a hydroxylammonium salt according to claim 1, wherein said alkali metal sulfide is sodium sulfide, potassium sulfide or lithium sulfide.

9. The process for producing a hydroxylammonium salt according to claim 1, wherein temperature of the first reductive treatment is 50° C. to 150° C., and time of the first reductive treatment is 0.5 hour to 10 hours.

10. The process for producing a hydroxylammonium salt according to claim 1, wherein time of the second reductive treatment is 0.5 hour to 10 hours.

11. The process for producing a hydroxylammonium salt according to claim 1, wherein the amount of reductant used in the second reductive treatment is at least one mole per platinum atom.

* * * * *